Jan. 23, 1934.　　　　　　J. AIKEN　　　　　　1,944,726

COOLING DEVICE

Filed March 18, 1932

INVENTOR

James Aiken.

Patented Jan. 23, 1934

1,944,726

UNITED STATES PATENT OFFICE 1,944,726

COOLING DEVICE

James Aiken, Forest Hills, N. Y.

Application March 18, 1932. Serial No. 599,839

5 Claims. (Cl. 62—1)

This invention relates to a cooling device, and more particularly to a device for household use for cooling beverages and other liquids.

One object of my invention is to provide an improved device of a form convenient for cooling or freezing in domestic refrigerators and for immersion in a liquid to be cooled.

A further object is to provide a sealed expansible member containing a liquid to be frozen or chilled in a refrigerator, and a still further object is to provide such member with a handle or stem so that it may be utilized to stir the beverage while cooling the same.

With these and other objects in view the invention consists in a cooling device constructed and used in the manner hereinafter described with reference to the accompanying drawing whereon:—

Figure 1:
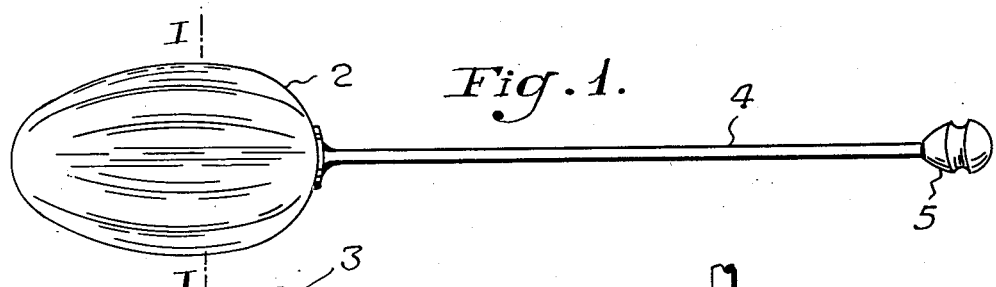
Figure 1 is a side view of one form of the device.
Figure 2:
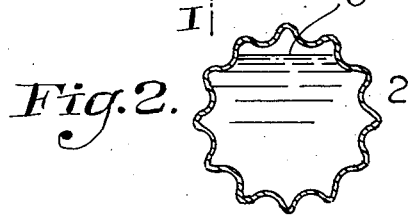
Fig. 2 is a cross-section on the line I—I of Fig. 1.
Figure 3:
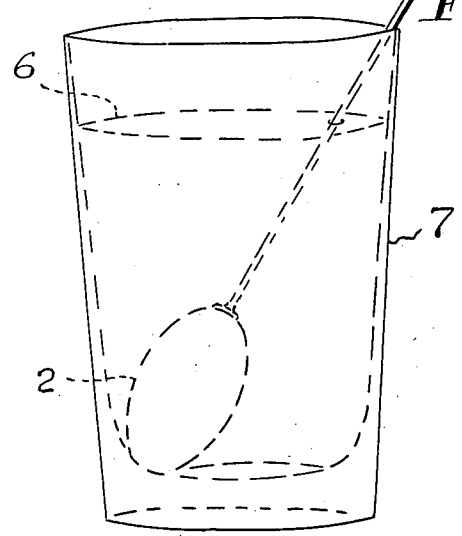
Fig. 3 is a perspective view of the device immersed in a liquid to cool the same.

The device shown at Figs. 1 and 2 comprises a hollow member 2 having thin metallic walls which are corrugated or fluted, or otherwise formed to provide a large external surface for the transfer of heat. This member 2 is hermetically sealed and contains a liquid 3—preferably water—adapted to freeze in the cooling units of ordinary domestic refrigerators. Permanently attached to this member is a stem 4 which may have an ornamental end knob 5; and as shown at Fig. 3 the device is adapted for insertion into a liquid 6 in a glass or container 7 so that it may be used to stir or mix the liquid 6 and at the same time to cool the same due to the melting and warming of the frozen liquid 3 within the member 2 without diluting the liquid 6, as is the case when ice chips or cubes are introduced into the same in the ordinary way, and due to the maximum surface presented by the member 2 the cooling effect is not delayed by the thin metallic wall interposed between the cooling medium 3 and the liquid 6 being cooled.

Figure 4:
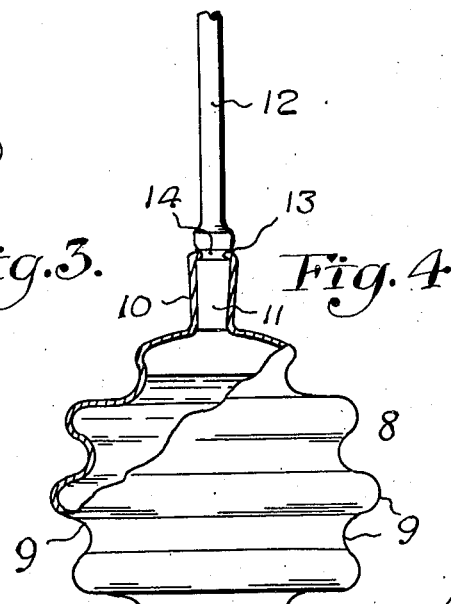
Fig. 4 is an enlarged side view partly in section showing a modified form of the device.

Fig. 4 shows a hollow member 8 having annular corrugations 9 and a sleeve member 10 which receives a tapered end 11 in a stem 12 while the extremity 13 of the sleeve 10 is clinched into an annular groove 14 in the stem to provide a water-tight joint.

Figure 5:
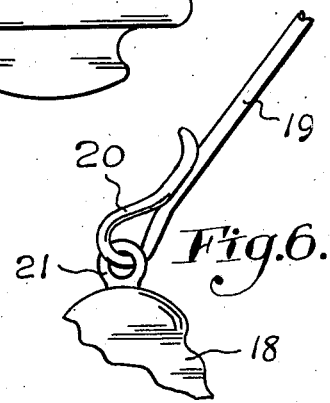
Fig. 5 is a similar view showing another form.

Fig. 5 shows another form of hollow member comprising two similar sections 15 sealed together with a seamed or clinched joint 16, while the stem 17 is welded or otherwise secured thereto.

Figure 6:
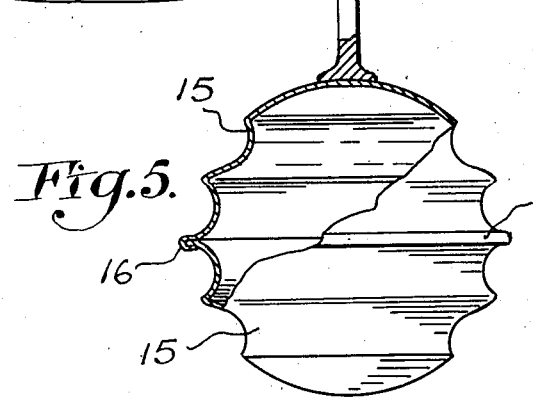
Fig. 6 is a detail view showing a means of detachably connecting the cooling member to its stem.

Fig. 6 shows a means for the detachable connection of the hollow member 18 with the stem 19, the latter being formed with a spring hook or loop 20 adapted to engage a ring or eye 21 secured on the member 18. Various means may be provided for the convenient detachment of the hollow members from their stems so that, if desired, the said members may be placed in the cooling units of the refrigerators without their stems.

When the hollow member contains a liquid adapted to freeze to solid form a small air space may be provided as shown at Fig. 2 and the walls of the said member are sufficiently thin and are so shaped that they may expand due to the formation of ice so that there is no danger of bursting.

While the device has been described as comprising a water containing member, it will be understood that the member may contain other liquids or fluids, or may contain solids or may be of solid metal or other material throughout.

What I claim is:

1. A cooling device of the character described comprising a thin-walled member containing a liquid to be frozen, annular corrugations in the walls of said member to permit expansion, and a stem whereby the said member may be immersed in and may serve to mix or stir the liquid to be cooled.

2. A cooling device of the character described comprising an expansible thin-walled and corrugated or fluted member, a cooling element hermetically sealed therein, and a detachable handle stem for said member.

3. A cooling device of the character described comprising a fluted cooling member to be cooled in a domestic refrigerator and to be immersed in and to stir the liquid to be cooled, a stem serving as a handle for the said member while cooling the liquid, and means for detachably connecting the stem to the said member.

4. A liquid cooling device comprising a hollow member for direct contact with the liquid to be cooled, a freezable liquid sealed within said member, a stem handle for the said member, and means for the detachable connection of said member to its handle.

5. A device for use in cooling and mixing liquids comprising a sealed cooling member to be immersed in the liquid to be cooled, a rigid stem to serve as a handle for said hollow member while mixing the liquid and spring means for detachably connecting said member and stem.

JAMES AIKEN.